J. L. WARE.
FOUR WHEEL DRIVING DEVICE FOR MOTOR PROPELLED VEHICLES.
APPLICATION FILED OCT. 11, 1913.

1,201,898.

Patented Oct. 17, 1916.
3 SHEETS—SHEET 1.

Witnesses:
Theo. Lagaard
H. A. Bowman

Inventor:
Joseph L. Ware.
By F. A. Whiteley
his Attorney.

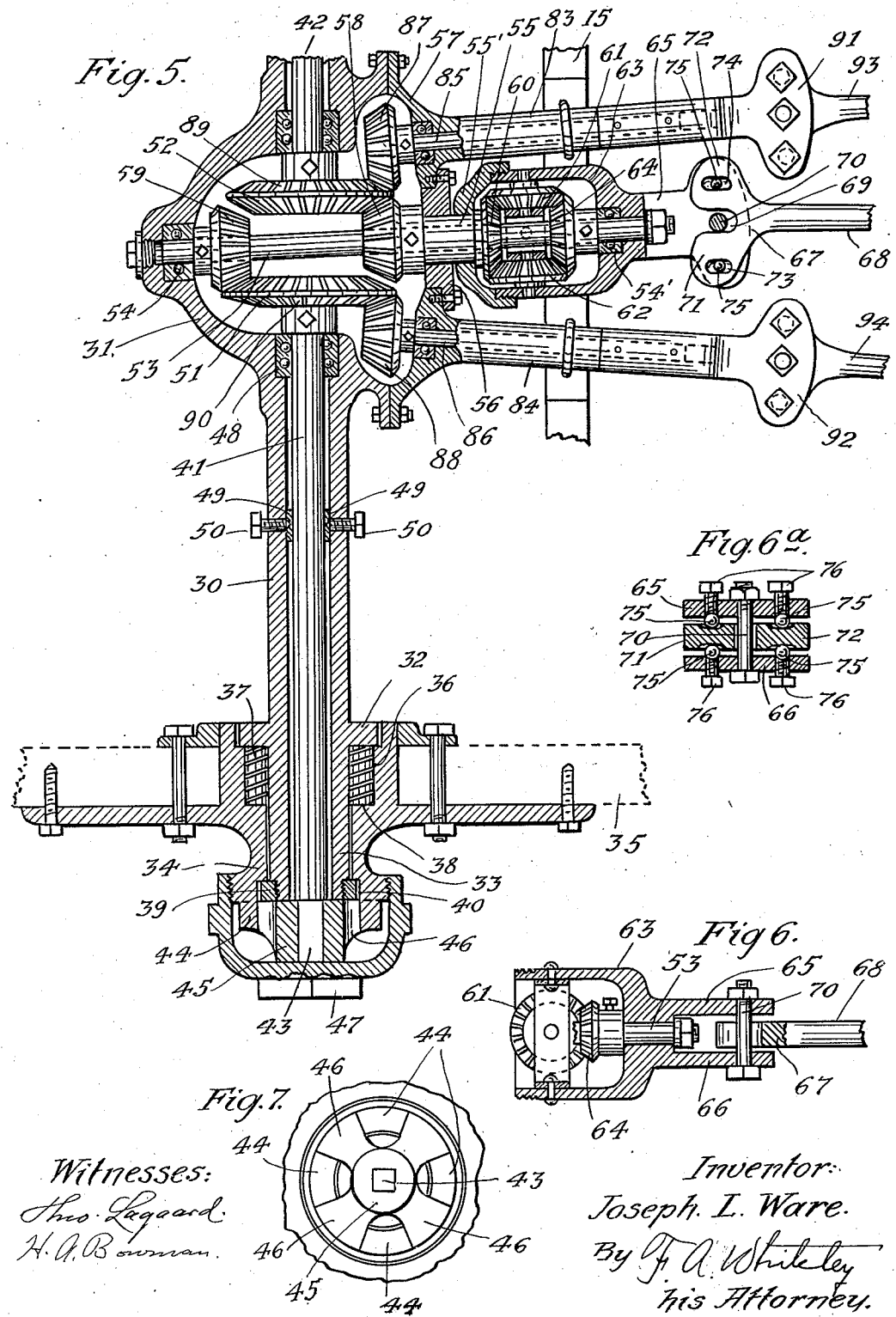

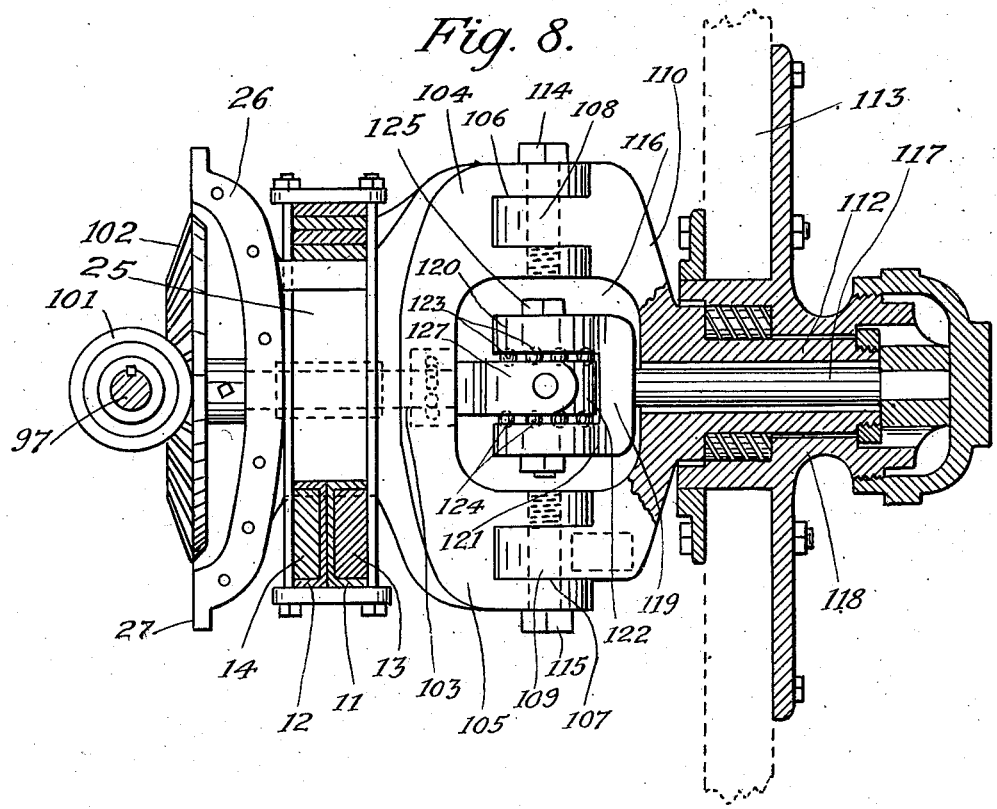

UNITED STATES PATENT OFFICE.

JOSEPH L. WARE, OF ST. PAUL, MINNESOTA, ASSIGNOR TO TWIN CITY FOUR WHEEL DRIVE COMPANY, OF ST. PAUL, MINNESOTA, A CORPORATION OF SOUTH DAKOTA.

FOUR-WHEEL DRIVING DEVICE FOR MOTOR-PROPELLED VEHICLES.

1,201,898.   Specification of Letters Patent.   Patented Oct. 17, 1916.

Application filed October 11, 1913. Serial No. 794,733.

*To all whom it may concern:*

Be it known that I, JOSEPH L. WARE, a citizen of the United States, residing at St. Paul, in the county of Ramsey and State of Minnesota, have invented certain new and useful Improvements in Four-Wheel Driving Devices for Motor-Propelled Vehicles, of which the following is a specification.

My invention relates to four-wheel driving devices for motor propelled vehicles and has for its object to provide an all-shaft drive controlled by a single differential for directly driving each of the wheels of the vehicle, in combination with a framework to which said driving means is connected so as to tie the same securely and at the same time permit adequate flexibility of operation.

The full objects and advantages of my invention will appear in connection with the detailed description thereof and are particularly pointed out in the claims.

Figure 1:
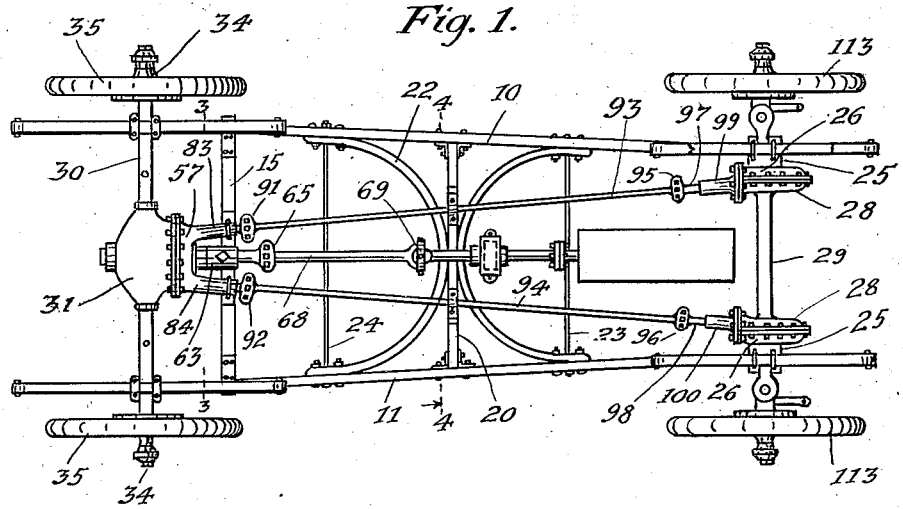
Figure 2:
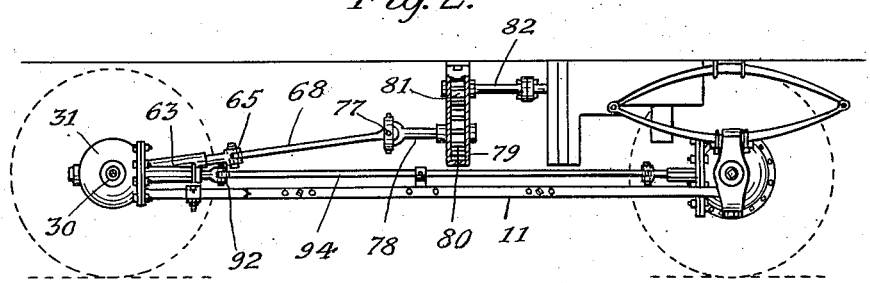
Figure 3:
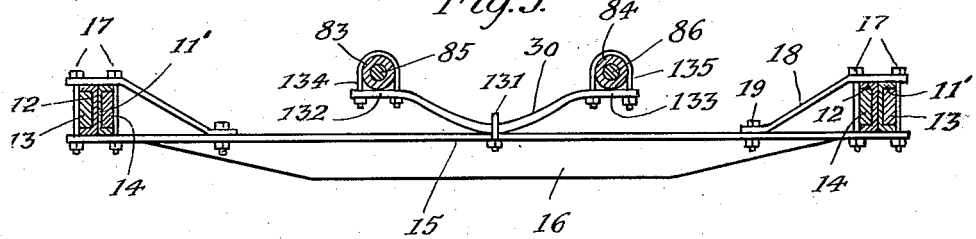
Figure 4:
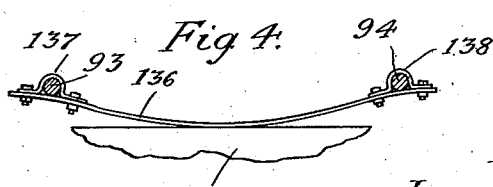

In the drawings illustrating the application of my invention in one form: Figure 1 is a plan view of the frame work of a vehicle embodying my improvements. Fig. 2 is a side sectional view partly diagrammatic. Fig. 3 is a section on line 3—3 with some parts omitted. Fig. 4 is a similar section on line 4—4. Fig. 5 is an enlarged sectional plan showing the arrangement of differential and driving mechanism. Fig. 6 is a sectional detail at right angles to the showing of Fig. 5. Fig. 6ᴬ is a detail of Fig. 6. Fig. 7 is an end view of the rear wheel hub. Fig. 8 is an enlarged sectional view of the front axle structure and the manner of supporting and driving the wheel therefrom. Fig. 9 is a sectional detail view of the flexible joint from the driving spindle to the wheel spindle.

It may be noted at the outset that all of the driving parts of my machine are incased with the exception of the intermediate sections of driving shafts. Not only are all gears incased, but the drive spindle of both front and rear wheels run in tubular casings so that no bearing portion of the entire mechanism is exposed to the dust and dirt so largely incident to the use of a road vehicle. The frame of my machine is especially contrived to meet the requirements of a four-wheel drive in which a combination of rigidity sufficient to withstand all normal strains and shocks and flexibility to permit accommodation of the parts to the irregularities of a roadway are essential without undue drain upon the power. The frame base comprises side beams 10 and 11, which, as clearly shown in cross section in Figs. 3 and 8, comprise pairs of channel irons 11′ and 12 secured with the backs thereof engaging and having the flanges filled with strips 13 and 14, which may be of wood or other light and flexible material, as desired. The frame members 10 and 11 are secured together at a point near the rear axle by a cross-bar 15, said cross-bar comprising a top plate and a depending flange member 16, said top plate passing directly beneath the cross-bars 10 and 11 and being secured thereto by means of bolts 17 passing through the top plate and an over-strap 18 secured to said top plate at 19 and having a portion thereof extending above frame members 10 and 11, as clearly shown in Fig. 3. The frame members 10 and 11 are further secured together near the centers thereof by means of a cross-bar 20 and on either side of said cross-bar 20 are half circles 21 and 22, respectively, which have the centers thereof bolted to cross-bar 20 and the free end bolted to the frame members 10 and 11, bolts 23 and 24 extending across the framework between the ends of said half circles. This structure, which is in effect a reach, gives a frame that is capable of withstanding longitudinal or tension strains of considerable magnitude and yet which will have a certain spring to it to permit torsional or twisting strains. This reach-like frame in fact has functions of both the torsion rods and radius rods employed in many automobile frame structures. It also has the effect of restraining the front and rear axles from relative rotary motion and maintains the axles substantially equidistant. It has about the same radius movement as the side driving shafts which avoids continual lengthening and shortening of such shafts when running over uneven roads. Furthermore, this reach-like frame takes a considerable part of the strain which in the common frame designs must be sustained entirely by the springs.

Mounted directly upon the forward portion of the frame members 10 and 11 are front axle castings 25, as shown in detail in Fig. 8, said castings being the same at each side of the machine. The castings are provided with expanded casing members 26, having thereon peripheral flanges 27 by which the axle castings 25 are secured to similar casing members 28 on the end of a central axle member 29. The casing sections 26 and 28 provide the housing for the drive gears for the front wheels, as will hereinafter be described. At the rear portion of the framework a tubular cross axle 30 is secured upon the frame members 10 and 11, said axle casting being provided with a central expanded portion 31 for the reception of the drive gearing for the rear wheels, as will hereinafter be described.

The tubular rear axle is provided with a peripheral flange 32 adjacent the end thereof, outside of which said tubular member comprises a bearing spindle 33 for the reception of the hubs 34 of the rear wheels 35. The aperture within said hub, as clearly shown in Fig. 5, is of greater diameter than the spindle 33, and an enlarged bearing portion 36 is provided within which are roller bearings 37, one end of said bearings engaging the flange 32, the other end coming against a shoulder 38 in such enlarged portion 36. The wheels 35 are held in position upon the spindle 33 by means of a ring nut 39 which is threaded upon the spindle 33 and enters an annular opening 40 in the end of the hub 34. Within the tubular axle 30 and extending in opposite directions from the expanded portion 31 thereof are drive spindles 41 and 42, which spindles extend beyond the end of bearing spindles 33, the extended portion 43 of said drive spindles being square, as clearly shown in Figs. 5 and 7. The hubs 34 are formed with projecting lugs 44 extending parallel with the square portion 43. Adapted to seat upon the said square portion 43 is a star nut 45, the wings 46 of which engage between the lugs 44. A cap nut 47 is threaded upon the outside of hub 34, setting the star nut 45 firmly in place and securely closing the end of the hub. The shafts 41 are of smaller diameter than the interior of tubular axles 30 and have a ball bearing as indicated at 48, adjacent expanded portion 31, within which the shafts are driven. The remainder of the shaft simply floats within the axle and between said bearing and the point of attachment of the portion 43 with the wheel hub through star nut 45, lugs 44 and cap nut 47. If desired, bearing rings 49 may be held in position within tubular axle 30 by set screws 50 at a point not far removed from the ball bearings 48.

Upon the inner end of shafts 41 and 42 and within the casing formed by expanded portion 31 are double-faced bevel gears 51 and 52. A drive shaft 53 has the end thereof supported in a ball bearing 54 formed in the expanded portion 31, said drive shaft passing through a sleeve 55 and being supported at its other end in a ball bearing 54' formed in a differential gear casing 63 secured to drive-shaft as will later be described. The sleeve 55 is supported in a bearing formed in a removable piece 56 secured to a plate casting 57, which is bolted to the open end of expanded portion 31, and a cap 55' threaded to the open end of casing 63 has a bearing on sleeve 55. The shaft 53 is obliquely positioned relative to the planes of bevel gears 51 and 52 and has thereon a bevel gear 58 meshing with the inner teeth of bevel gear 52 at the forward periphery thereof, and a bevel gear 59 meshing with the inner teeth of bevel gear 51 at the outer periphery thereof or at the opposite side thereof from bevel wheel 58. Bevel gear 58 does not engage bevel gear 51 and bevel gear 59 does not engage bevel gear 52. It follows, therefore, that when shaft 53 is being rotated the respective bevel gears 51 and 52 and shafts 41 and 42 will each be rotated in the same direction.

The sleeve 55 has thereon a bevel gear 60 meshing with two bevel gears 61 and 62 journaled in the casing 63 at right angles to the shaft 53. Shaft 53 has fast thereon a bevel gear 64, also meshing with the bevel gears 61 and 62, the entire arrangement when taken in connection with the method of driving comprising a set of differential gearing. As clearly shown in Fig. 6, the casing 63 is provided with a pair of parallel arms 65 and 66, between which extends a flat-sided head 67 of main drive shaft 68. The head 67 has a central notch 69 through which extends a bolt 70, and has two side wings 71 and 72, having on each side thereof elongated depressions 73 and 74, respectively. Within these depressions are ball bearings 75, which are held seated by means of set screws 76, as best shown in Fig. 6A. This provides a perfectly flexible joint and yet one which gives a very large bearing surface and will operate smoothly without rattle or chance for wear, and in which, if wearing of the bearings does take place, the set bolts 76 may be used to take up such wear. In this connection it will be noted that when the drive shaft 68 is rotated by means hereinafter described the casing 63 will be correspondingly rotated. This carries with it the gears 61 and 62, which, meshing on opposite sides with the gear 60 on sleeve 55 and the gear 64 on shaft 53, will drive said sleeve and shaft equally as long as the resistance to rotation of sleeve 55 is equal to the resistance of rotation of shaft 53, under which conditions the gears 61 and 62 will remain stationary. This rotation of the sleeve 55 and shaft 53 in unison greatly reduce the friction of the parts since there is normally no movement between said shaft and sleeve, gear 58 on sleeve 55 driving the shaft 42 and gear 59 on shaft 53 driving the shaft 41 at equal speeds and in the same direction.

The uneven resistances, such as are produced in the wheels at one side in going around a curve when communicated to the transmission gears and differential gears, produce on shaft 53 or the sleeve 55 a retardation which causes rotation of the gears 61 and 62 and a correspondingly increased speed of rotation on the other of said elements and an increased drive in the wheels on the opposite side of the vehicle, an action common to vehicles having differential gearing. It is to be noted, however, that in the gearing of my invention the differential moves with the drive shaft, all parts rotating in absolute unison excepting when the aforesaid differential action takes place. The gears 61, 62, and 60, 64 may all be made very small so that the differential casing 63, as clearly indicated in Fig. 1, appears to be but a moderate expansion on the drive shaft and involves very little added weight of material. It is also true that by placing the differential gearing in a separate casing outside of the transmission casing formed by the expanded portion 31 and the cap piece 57 the differential mechanism can easily be got at for repairs and can quickly be removed from the device without having to disturb or dismantle the transmission mechanism. It will be noted also that this differential, when compared with a differential in the usual position in the hub of the gear drive, has a certain leverage over the driven mechanism, and therefore can be made lighter and smaller than would otherwise be the case.

It is true that in turning corners the front wheels on either side of the vehicle as compared with the rear wheels on the same side will strike an arc of slightly greater radius so that the absolute distance traveled will be somewhat greater by the front wheel than the rear wheel. This variance is taken up in two ways, first, by absorption of lost motion through the various contacting gears, and second, from the fact that the side propeller shafts are made of spring material which permits a little twisting thereof that will immediately restore the parts, including the propeller shafts, to proper relative position at the moment when the wheels will leave the ground from bounding over slight obstructions, as will invariably take place in a short distance of travel.

The drive shaft 68 is connected by universal joint 77 with a short shaft 78 journaled in a boxing 79 within which is a spur gear 80, said spur gear meshing with a spur pinion 81 on the crank shaft 82 of the engine. This arrangement is particularly desirable for heavy trucks in which large tractive capacity rather than high speed is essential, the spur gear 81 not only operating to reduce the speed but the arrangement making it possible to bring drive shaft 68 more nearly into the horizontal plane of the four-wheel drive mechanism so that said shaft will not need to operate at much of an angle. The differential within casing 63 is thus made a part of the primary drive shaft, instead of, as is usual, being formed in conjunction with the axle sections of the driving wheels.

The cap member 57 is provided with forwardly extended tubular bearing portions 83 and 84 cast integrally thereon. Within the bearings formed inside of said members are shafts 85 and 86 having thereon bevel gears 87 and 88 meshing respectively with the outside bevel gears 89 and 90 on double-faced bevel gears 51 and 52. The shafts 85 and 86 have secured thereto bifurcated heads 91 and 92 straddling flat-sided heads on drive shafts 93 and 94, the parts being combined to form flexible and extensible joints similar to that already described by which shaft 68 is connected with casing member 63. The shafts 93 and 94 are connected by similar flexible and extensible joints 95 and 96 with short shaft sections 97 and 98 running in tubular bearings 99 and 100 on cap pieces secured to the united casing members 26 and 28 heretofore described. Upon the ends of shafts 97 and 98 within the aforesaid casing is a bevel pinion 101 meshing with a bevel gear 102 on the end of a shaft 103 extending through casting 25. The casting 25, as best shown in Fig. 8, has two arms 104 and 105, each provided with a cleft portion 106 and 107 respectively, within which engage tongues 108 and 109 on arms 110 and 111 extending from the front axle spindles 112 to which spindles are secured the front wheels 113 in exactly the same manner as the rear wheels 34 are secured to the rear spindles 33, as already described. Pivot bolts 114 and 115, extending through the aforesaid cleft portions of arms 104 and 105 and the tongues 108 and 109 straddled thereby, provide the vertical axes upon which the front wheel spindles are oscillated for steering the vehicle.

As clearly shown in Fig. 8, there is provided between the sets of arms 104, 105 and 110, 111, a space 116. A drive spindle 117 is secured to the front wheel hub 118 at the outer extremity thereof in the manner described with respect to the spindles 41 and 42 of the rear wheels, said spindle 117 having a head 119 provided with two arms 120 and 121 extending within said space 116. Between the arms 120 and 121 is a circular disk 122, and between the faces of disk 122 and the adjacent faces of arms 121 and 120 are sets of ball bearings 123 and 124. A bolt 125 extends through arms 120 and 121 and through an enlarged circular aperture 126 in disk 122. The shaft 103 has thereon a fork 127 straddling the disk 122 and secured thereto by means of trunnion pins 128 and 129 respectively. This provides a universal joint in the plane of the vertical axis formed by bolts 114 and 115, and yet one in which there is some extensibility, while at the same time a large engaging surface between the spindle sections is provided and antifriction or ball bearings between said surfaces.

As clearly shown in Figs. 1 and 3, the bearing extensions 83 and 84 are tied down to the transverse frame member 15. To accomplish this a rocker 130 is secured by means of a U bolt 131 to top plate of crossbar 15 so as to be capable of some rolling movement upon said top plate. The nuts 132 and 133 of said rocker come beneath the bearing extensions 83 and 84 respectively and are secured thereto by means of U bolts 134 and 135. This construction binds the combined castings 57 and 31 to the frame or reach and acts as a torsion rod of the automobile at a point considerably in advance of the other point of attachment through axles 30, thus restraining the tendency to lift such castings when the engine is started under load. At the same time, the rocker 130 will permit the necessary slight flexibility required when the wheels rest upon sharply different levels, as happens when a wheel drops into a hole or goes up over an obstruction. As clearly shown in Fig. 4, a spring member 136 rests upon the center crossbar 20 and has the ends thereof extended beneath the shafts 93 and 94. U pieces 137 and 138 are secured to the spring member 136 and passes loosely over said shafts 93 and 94 respectively. This operates to steady the shafts 93 and 94.

The above arrangement of parts provides a four-wheel drive which combines the meritorious features of being in a high degree simple, absolutely exact in its operation, perfectly flexible so as to accommodate the driving mechanism, without cramping or binding, to all of the irregularities of the surface over which the machine is being driven, yet having no lost motion or parts which can rattle or become loose from wear. Moreover, but a single differential gear is employed for the entire four-wheel drive, and that is incased in the main driving shaft. A four-wheel drive which employs sprocket chains cannot be exact in its operation and cannot drive the wheels uniformly, as there is always more or less lost motion for each of the chains employed, and yet the amount of lost motion will not be exactly the same for each wheel. The element of lost motion in a four-wheel drive whereby one or the other of the sets of wheels may be caused to effect the entire starting of the vehicle, is a serious matter where the drive is employed for heavy trucks and the starting of the same presents the largest measure of difficulty. To get the really effective results desired from a four-wheel drive it is essential that the four wheels be rotated in unison, especially at the start. It is impossible to effect such a result where sprocket chains are employed, and even with an all-shaft drive if there are many gears between the rear drive and the front drive there may be some lost motion, which would injuriously affect the results obtainable from the machine. I have found that by setting the front wheels to drive a trifle faster than the rear wheels the best possible results are obtained, and I accomplish this by providing the bevel gears 102 of slightly less diameter than the bevel gears 90 and 89, so that there will be one less tooth or different grades of pitch in the circumference in such bevel gears 102 than in the circumference of bevel gears 89 and 90. The primary drive is always through double bevel gears 51 and 52, having on the backs thereof bevel gears 89 and 90, and the above described structure has the effect of taking up all play between the gear teeth of bevel gears 102 for the front wheel drive before any of the wheels are started, so that the effective drive of the wheels is simultaneous. Theoretically the front wheels travel slightly faster than the rear wheels. In practice this does not result in the slippage or wear of the tires of the front wheels, but merely has the effect of always keeping the shafts and gears for the front wheel drive in tight contact so that the effective tractive force of all four wheels is constantly exerted in substantial uniformity.

Machines embodying the above described details of construction are built and being put to extensive use. And the said devices operate in practice with a high degree of efficiency. The machines built are trucks used for hauling heavy loads, and experimental tests have demonstrated that all of the four wheels of the truck not only operate simultaneously in propelling the load when the same is in motion, but act absolutely together in starting the load. It is therefore found that where a heavy load is stopped in mud or sand or with the front wheels in depressions, it nevertheless may be started and driven without difficulty. It has been demonstrated by experimental construction and the practical use of such machines that to get fully effective results from a four-wheel drive the machinery must be so organized that the wheels on any one side will move substantially in unison. If therefore one wheel slips without moving the load the other wheel also would have to slip without moving the load. Such a result is very unlikely to happen because it is unlikely that more than one wheel on a given side will be positioned in a soft place or hole. Of course, if a wheel does slip it digs the hole deeper and tends to destroy the tire. The construction of the differential of my invention, however, effects perfectly simultaneous operation of the front and rear wheels on the same side. In use it has been found that if the hind wheel on a given side is in soft ground the front wheel on the same side is in hard ground, and vice versa; therefore, if the wheels are turned at all the load will be moved.

I claim:

1. A four-wheel drive comprising rear axle sections and front axle sections, all of said axle sections being provided with bevel gears, a propeller shaft having thereon bevel pinions meshing alternately and at opposite sides of the axes thereof with the bevel gears on the rear axle sections, reversely-turned bevel gears on said rear bevel gears and shafts having bevel gears meshing with said reversely-turned bevel gears and said front axle bevel gears.

2. A four-wheel drive comprising rear axle sections, a propeller shaft geared to and at opposite sides of the axes of said sections for driving the same, a differential gear within the extent of said propeller shaft, front axle sections and shafts for driving the front axle sections directly from the rear axle sections.

3. A four-wheel drive comprising rear axle sections and means for driving the same, each being provided at their adjacent ends with double-faced bevel gears, a propeller shaft, including a differential gear, geared alternately and at opposite sides of the axes thereof with the inturned bevel faces of said bevel gears, and shafts directly geared to the outturned bevel faces of said bevel gears and to the front axle sections for driving the latter.

4. A four-wheel drive comprising rear axle sections and means for driving the same differentially, front axle sections, shafts geared directly to said rear axle sections and said front axle sections for driving the latter from the former, said gearing being so proportioned relatively that the front axle sections will be driven at a speed slightly greater than the rear axle sections.

5. A four-wheel drive comprising rear axle sections and front axle sections, each of said rear axle sections having thereon inwardly and outwardly turned bevel gears of the same diameter and number of teeth, each of said front axle sections having thereon a bevel gear of slightly less diameter and formed of one less tooth than the bevel gears on the rear axle sections, means for driving the rear axle sections and shafts provided with identical bevel gears at each end meshing with the outwardly turned bevel gears on the rear axle sections and the bevel gears on the front axle sections whereby the front axle sections will be driven at a speed slightly greater than the rear axle sections.

6. A four-wheel drive comprising rear axle sections each being provided at their adjacent ends with double-faced bevel gears, a propeller shaft geared alternately and at opposite sides of the axes thereof with the in-turned bevel faces of said bevel gears, shafts directly geared to the out-turned bevel faces of said bevel gears and to the front axle sections for driving the latter, a casing for said bevel gears having extensions forming elongated bearings for said shafts, a crossbar, and a rocker secured to the crossbar at its center and having the ends thereof secured to said extensions.

7. A four-wheel drive comprising rear axle sections each being provided at their adjacent ends with double-faced bevel gears, a propeller shaft geared alternately and at opposite sides of the axes thereof with the in-turned bevel faces of said bevel gears, shafts directly geared to the out-turned bevel faces of said bevel gears and to the front axle sections for driving the latter, a crossbar, and means for tying the shafts to the crossbar.

8. A four-wheel drive comprising rear axle sections each being provided at their adjacent ends with double-faced bevel gears, a propeller shaft geared alternately and at opposite sides of the axes thereof with the in-turned bevel faces of said bevel gears, shafts directly geared to the out-turned bevel faces of said bevel gears and to the front axle sections for driving the latter, a crossbar, and means for tying the shafts to the cross bar, said tying means being movable relative to the crossbar.

9. A four-wheel drive comprising rear axle sections each being provided at their adjacent ends with double-faced bevel gears, a propeller shaft geared alternately and at opposite sides of the axes thereof with the in-turned bevel faces of said bevel gears, shafts directly geared to the out-turned bevel faces of said bevel gears and to the front axle sections for driving the latter, a crossbar, a rocker loosely fastened at its center to said crossbar, and means extending over said shafts for securing the same to the ends of said rocker.

10. A four-wheel drive comprising rear axle sections and front axle sections, shafts geared to each pair of front and rear axle sections on the same side, said shafts being in the plane of the axle sections, a motor shaft above the plane of said shafts having thereon a pinion, a flexible drive shaft geared to drive the rear axle sections, and a spur gear on said drive shaft meshing with said pinion for effecting reduction of speed from engine shaft to drive shaft and causing the drive shaft to be positioned more nearly in the plane of said first named shafts and axle sections.

11. A four-wheel drive comprising rear axle sections and front axle sections and shafts geared to drive the latter from the former, bevel gears on the rear axle sections revoluble on the same axis, a shaft disposed obliquely between said bevel gears, bevel gears on the shaft meshing independently with and on opposite sides of the axes of said rear axle bevel gears, a casing inclosing all of said bevel gears, a differential mechanism outside of said casing connected with said shaft, and means connected with the differential mechanism for rotating the shaft.

12. A four-wheel drive comprising rear axle sections and front axle sections and shafts geared to drive the latter from the former, bevel gears on the rear axle sections revoluble on the same axis, a shaft disposed obliquely between said bevel gears, bevel gears on the shaft meshing independently with and on opposite sides of the axes of said rear axle bevel gears, one of said bevel gears being carried by a sleeve revolubly mounted upon the shaft, a casing inclosing the bevel gears through which said shaft and sleeve project, a pair of equal gears mounted upon the ends of said projecting shaft and sleeve, a drive element formed with an inclosing casing over said equal gears, and differential gears journaled in the casing of said drive element and meshing with said equal gears.

13. A four-wheel drive comprising rear axle sections and front axle sections and shafts geared to drive the latter from the former, bevel gears on the rear axle sections revoluble on the same axis, a shaft disposed obliquely between said bevel gears, bevel gears on the shaft meshing independently with and on opposite sides of the axes of said rear axle bevel gears, one of said bevel gears being carried by a sleeve revolubly mounted upon the shaft, a casing inclosing the bevel gears through which said shaft and sleeve project, a pair of equal gears mounted upon the ends of said projecting shaft and sleeve, a drive element formed with an inclosing casing over said equal gears, differential gears journaled in the casing of said drive element and meshing with said equal gears, and a cap removably secured upon the casing of said driving element.

14. A four-wheel drive comprising rear axle sections and front axle sections and shafts geared to drive the latter from the former, bevel gears on the rear axle sections revoluble on the same axis, a shaft disposed obliquely between said bevel gears, bevel gears on the shaft meshing independently with and on opposite sides of the axes of said rear axle bevel gears, one of said bevel gears being carried by a sleeve revolubly mounted upon the shaft, a casing inclosing the bevel gears through which said shaft and sleeve project, a pair of equal gears mounted upon the ends of said projecting shaft and sleeve, a drive element formed with an inclosing casing over said equal gears, differential gears journaled in the casing of said drive element and meshing with said equal gears, and a yoke formed on said casing and providing part of a universal joint in said driving element.

In testimony whereof I affix my signature in presence of two witnesses:

JOSEPH L. WARE.

Witnesses:
F. A. WHITELEY,
H. A. BOWMAN.